(12) United States Patent
Takahashi et al.

(10) Patent No.: US 8,745,393 B2
(45) Date of Patent: Jun. 3, 2014

(54) TRANSMITTING APPARATUS, COMMUNICATING SYSTEM

(71) Applicants: Toshinari Takahashi, Tokyo (JP); Yoshikazu Hanatani, Kanagawa-ken (JP)

(72) Inventors: Toshinari Takahashi, Tokyo (JP); Yoshikazu Hanatani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/731,485

(22) Filed: Dec. 31, 2012

(65) Prior Publication Data

US 2014/0095877 A1  Apr. 3, 2014

(30) Foreign Application Priority Data

Sep. 28, 2012 (JP) .................................. 2012-218787

(51) Int. Cl.
    *H04L 9/32*  (2006.01)
(52) U.S. Cl.
    USPC .......................................................... 713/171
(58) Field of Classification Search
    USPC .......................... 713/168, 169, 170, 171, 172
    See application file for complete search history.

(56) References Cited

U.S. PATENT DOCUMENTS

| 7,225,163 | B1 * | 5/2007 | Han .................................. 705/52 |
| 7,607,009 | B2 * | 10/2009 | Peyravian et al. ............. 713/156 |
| 7,680,306 | B2 * | 3/2010 | Boutant et al. ................. 382/119 |
| 8,296,561 | B2 * | 10/2012 | Kanemura et al. ............ 713/155 |
| 2011/0093397 | A1 * | 4/2011 | Carlson et al. ................... 705/67 |
| 2013/0282591 | A1 * | 10/2013 | Faith et al. ....................... 705/71 |

* cited by examiner

*Primary Examiner* — Beemnet Dada
(74) *Attorney, Agent, or Firm* — Oblon, Spivak, McClelland, Maier & Neustadt, L.L.P.

(57) ABSTRACT

According to an aspect of the embodiment, there is provided a transmitting apparatus, including a data storage, a first key storage, a second key storage, an additional information generating unit, a first authenticator generating unit, a second authenticator generating unit, a third authenticator generating unit, and a packet transmitting unit.

a judging unit that judges the candidate is admitted as the second authenticator, when the candidate contains a common part of the first authenticator.

a third authenticator generating unit generates a third authenticator based on a second authenticator that is a second authenticator candidate contains a common part of the first authenticator. The packet transmitting unit transmits a packet including the data and the third authenticator.

3 Claims, 11 Drawing Sheets

TRANSMITTING APPARATUS, COMMUNICATING SYSTEM

CROSS-REFERENCE TO RELATED APPLICATION(S)

This application is based upon and claims the benefit of priority from Japanese Patent Application No. 2012-218787, filed on Sep. 28, 2012; the entire contents of which are incorporated herein by reference.

FIELD

Embodiments described herein relate generally to a data transmitting apparatus, a data communicating system.

BACKGROUND

When communicating devices communicate each other, it is a common practice to authenticate each other for that one communicating device confirms the other communicating device.

For example, a transmitter generates an authenticator based on data and a secret key and transmits the data with the authenticator. A receiver verifies whether the authenticator added to the data is valid or not using a secret key or a public key and judges whether the data transmitted by a valid device using a verification result.

In an authentication method using the authenticator or a digital signature, if an attack that attackers transmits many packets to a receiving apparatus is executed, normal communication is disturbed by increasing authentication processing in the receiving apparatus.

Therefore, there is a fast authentication method that processes authentication fast in TCP layer in addition to an authentication in application layer.

The fast authentication method prevents the normal communication disturbed by suppressing to increase authentication processing.

DETAILED DESCRIPTION

First Embodiment

Figure 1:
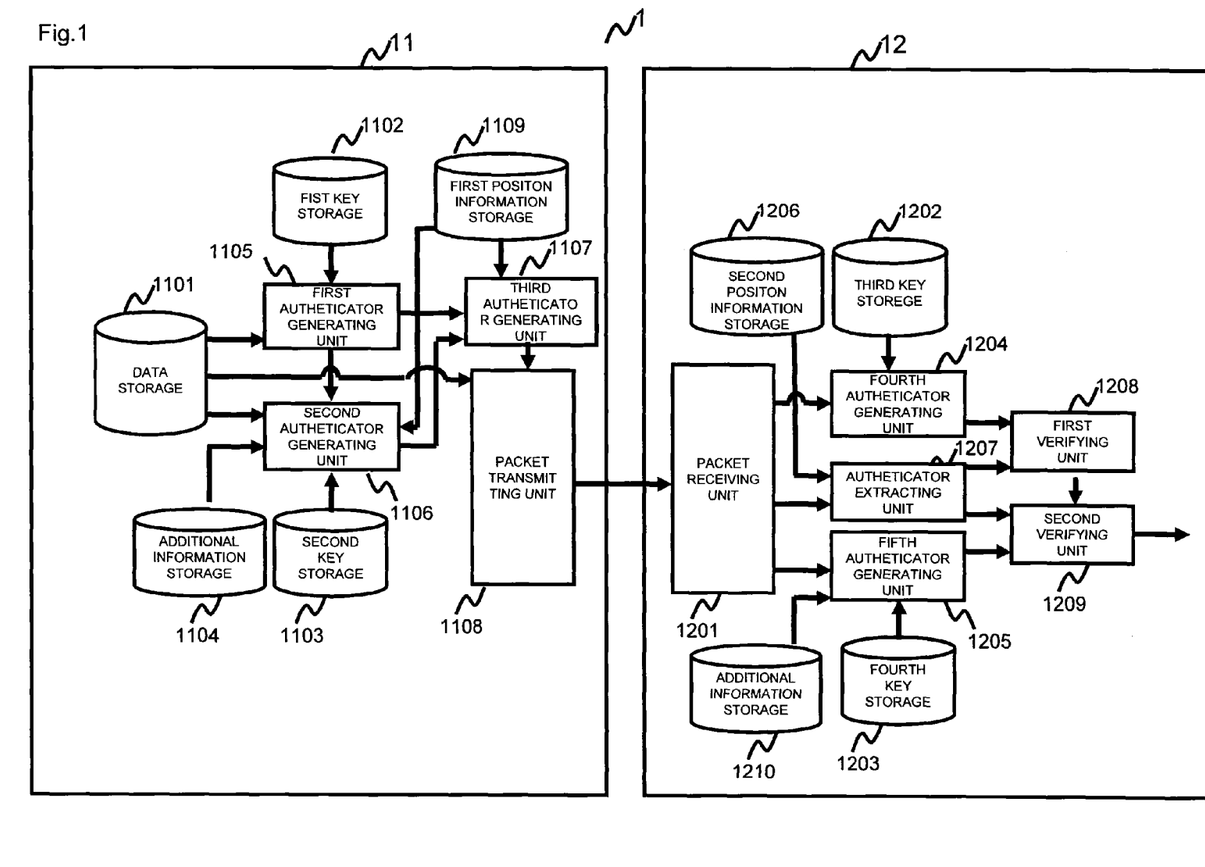
FIG. 1 is a block diagram illustrating a communicating system according to the first embodiment.

In this embodiment, a data communicating system 1 includes transmitting apparatus 11 and receiving apparatus 12. The transmitting apparatus 11 includes data storage 1101, a first key storage 1102, a second key storage 1103, an additional information generating unit 1104, a first authenticator generating unit 1105, a second authenticator generating unit 1106, a third authenticator generating unit 1107, a packet transmitting unit 1108.

The data storage 1101 stores data to be transmitting to the receiving apparatus 12.

The first key storage 1102 stores a first key used for generating a first authenticator.

The second key storage 1103 stores a second key used for generating a second authenticator.

The additional information generating unit 1104 generates additional information.

The additional information is used for generating the second authenticator.

The additional information may vary when generated in each time.

The first authenticator generating unit 1105 reads the data from the data storage 1101 and the first key from the first key storage 1102, and generates a first authenticator based on a read data and the first key.

A first position information storage 1109 of the transmitting apparatus 11 stores first position information.

The first position information includes a first field and a second field and third field and fourth field.

The first field indicates a position of a common part of the first authenticator. The common part of the first authenticator meets with that of the second authenticator.

The second field indicates a position of the common part of the second authenticator. The common part of the second authenticator meets with that of the first authenticator.

The third field indicates a position of the first authenticator in a third authenticator.

The fourth field indicates a position of the second authenticator in a third authenticator.

A second position information storage 1206 of the receiving apparatus 12 in FIG. 1 stores second position information. The second position information includes a first field and a second field and third field and fourth field.

The second position information meet first position information described below.

The transmitting apparatus have the first position information in advance and the receiving apparatus has the second position information in advance.

In other word, the transmitting apparatus and the receiving apparatus share the same information in advance.

The transmitting apparatus and the receiving apparatus may share the same information in any manner.

The first position information and the second position information are not secret information generally, but may be secret information shared by the transmitting apparatus and the receiving apparatus.

The second authenticator generating unit 1106 reads the data for transmitting from the data storage 1101 and the second key from the second key storage 1103.

The second authenticator generating unit 1106 receives the first authenticator from the first authenticator generating unit 1105 and additional information from the additional information generating unit 1104.

The second authenticator generating unit 1106 generates a second authenticator based on the data, the second key and the additional information by referring the first authenticator.

The second authenticator contains the common part of the first authenticator.

The second authenticator generating unit 1106 reads the first position information from the first position information storage 1109.

The second authenticator generating unit 1106 generates the second authenticator, a part of which indicated by the second field meets a part of the first authenticator indicated by the first field.

A third authenticator generating unit 1107 generates a third authenticator based on the second authenticator and a first part that is derived by removing the common part from the first authenticator.

The third authenticator generating unit 1107 generates the third authenticator by using the third field indicating information and the fourth field indicating information.

Figure 2:
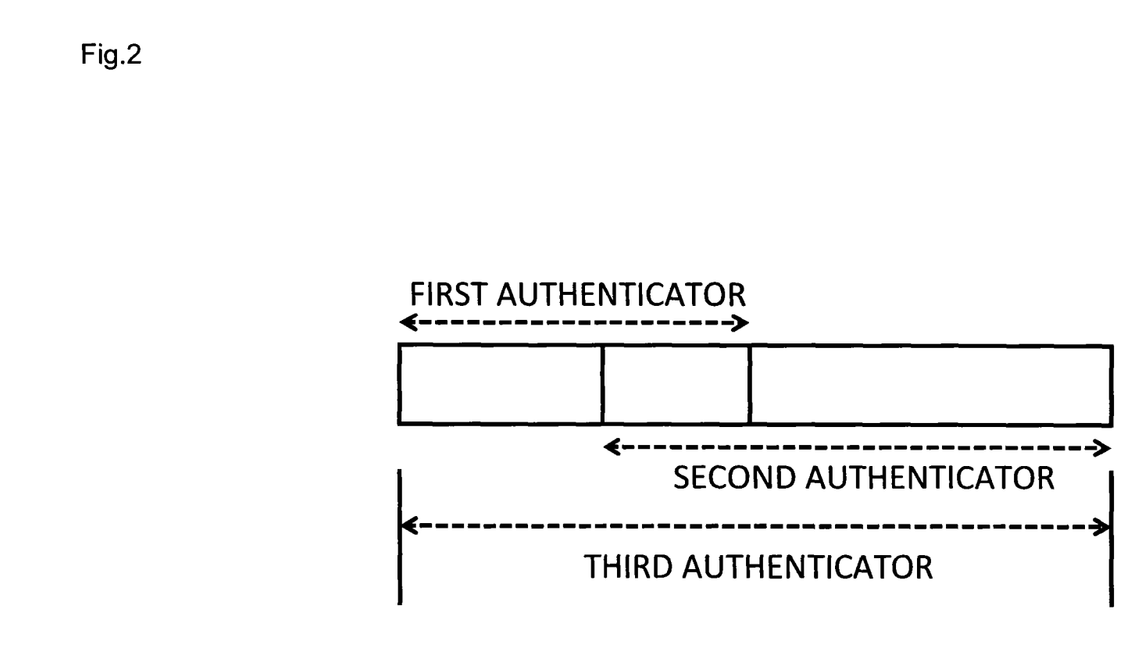
FIG. 2 is a data structure illustrating an example of a third authenticator.
Figure 3:
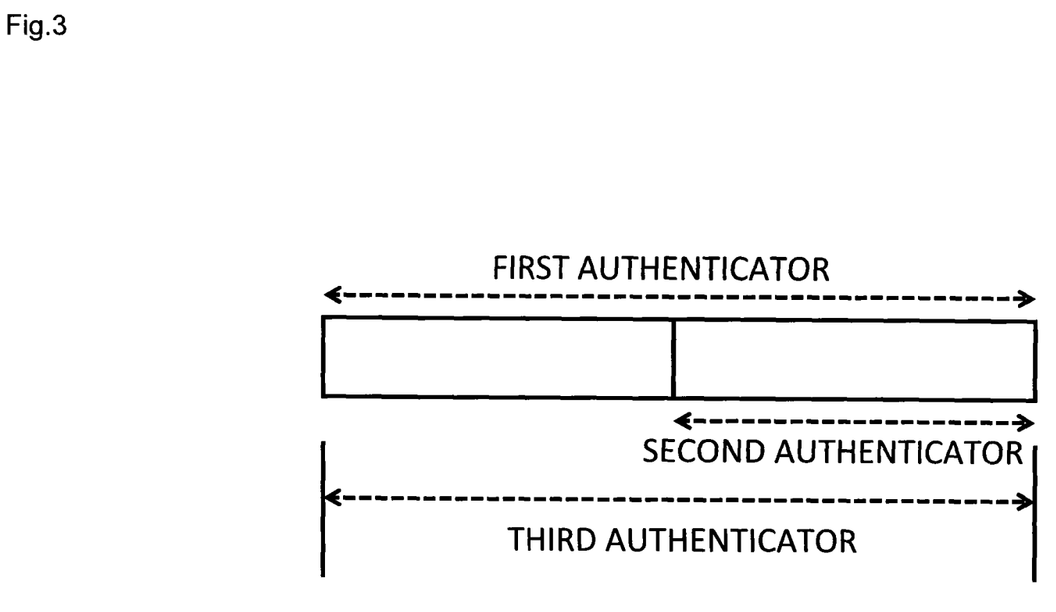
FIG. 3 is a data structure illustrating an example of a third authenticator.

FIG. 2 and FIG. 3 are a block diagram illustrating example of the first authenticator and the second authenticator and third authenticator.

FIG. 2 is a block diagram illustrating an example of data structure in case that a part of second authenticator meets a part of the first authenticator.

FIG. 3 is a block diagram illustrating an example of data structure in case that whole of second authenticator meets a part of the first authenticator.

A packet transmitting unit 1108 generates a packet included the data to be transmitted to the receiving apparatus and the third authenticator, and transmits the packet.

The receiving apparatus 12 includes a packet receiving unit 1201, a third key storage 1202, a fourth key storage 1203, a fourth authenticator generating unit 1204, a fifth authenticator generating unit 1205, a authenticator extracting unit 1207, a second position information storage 1206, a first verifying unit 1208, a second verifying unit 1209.

The packet receiving unit 1201 receives a packet transmitted by the transmitting unit 1108.

The third key storage 1202 stores a third key used for generating a fourth authenticator.

The fourth key storage 1203 stores a fourth key used for generating a fifth authenticator.

The fourth authenticator generating unit 1204 generates a fourth authenticator based on a data received by the packet receiving unit 1201 and the third key.

The fifth authenticator generating unit 1205 generates a fifth authenticator based on the data received by the packet receiving unit 1201, the fourth key and additional information generated by additional information generating unit 1210.

The second position information storage 1206 stores a second position information used for extracting the first authenticator and the second authenticator from the third authenticator included in a received packet.

The authenticator extracting unit 1207 extracts the first authenticator and the second authenticator from the third authenticator included in the received packet by using the second position information.

The second position information includes first field, which indicates a part that the first authenticator meets the second authenticator in the first authenticator, and includes second field, which indicates a part that the second authenticator meets the first authenticator in the second authenticator, and includes third field for identifying memory bits in which the first authenticator is included and includes fourth field indicating information for identifying memory bits in which the second authenticator is included.

The authenticator extracting unit 1207 extracts the first authenticator from the third authenticator by using the third field, and extracts the second authenticator from the third authenticator by using the fourth field.

A method for extracting is detailed as below.

For example, the third field is information indicating that first authenticator is consisted of bits from first predetermined bit in the bits contained in the third authenticator to second predetermined bit in the bits contained in the third authenticator.

The fourth field is information indicating that second authenticator is contained of bits from third predetermined bit in the bits included in the third authenticator to fourth predetermined bit in the bits contained in the third authenticator.

The first verifying unit 1208 verifies whether the fourth authenticator meets a first authenticator extracted by the authenticator extracting unit 1207.

If the fourth authenticator meets a first authenticator extracted by the authenticator extracting unit 1207, the first verifying unit 1208 outputs a verification result, which indicates that the fourth authenticator meets a first authenticator extracted by the authenticator extracting unit 1207, to a second verifying unit 1209.

If the fourth authenticator doesn't meet a first authenticator extracted by the authenticator extracting unit 1207, the first verifying unit 1208 executes an error handling process.

A typical way of the error handling process is a process for dropping the packet, but the examples are by no means limited thereto.

The second verifying unit 1209 verifies whether the fifth authenticator meets the second authenticator extracted by the authenticator extracting unit 1207, when the second verifying unit 1209 receives the first verification result.

If the fifth authenticator meets a second authenticator extracted by the authenticator extracting unit 1207, the second verifying unit 1209 outputs a second verification, which indicates that the fifth authenticator meets a second authenticator extracted by the authenticator extracting unit 1207.

If the fifth authenticator doesn't meet a second authenticator extracted by the authenticator extracting unit 1207, the second verifying unit 1209 executes an error handling process.

A typical way of the error handling process is a process for dropping the packet, but the examples are by no means limited thereto.

The additional information generating unit 1210 generates additional information that meets the additional information generated by the additional information 1104 in the transmitting apparatus 11.

As an example of method for generating the same additional information, the additional information generating unit 1210 generates the additional information by synchronizing time in the transmitting apparatus and time in the receiving apparatus.

In other words, the additional information generating unit 1210 generates the additional information that meets the additional information used for generating the second authenticator by synchronizing.

Figure 4:
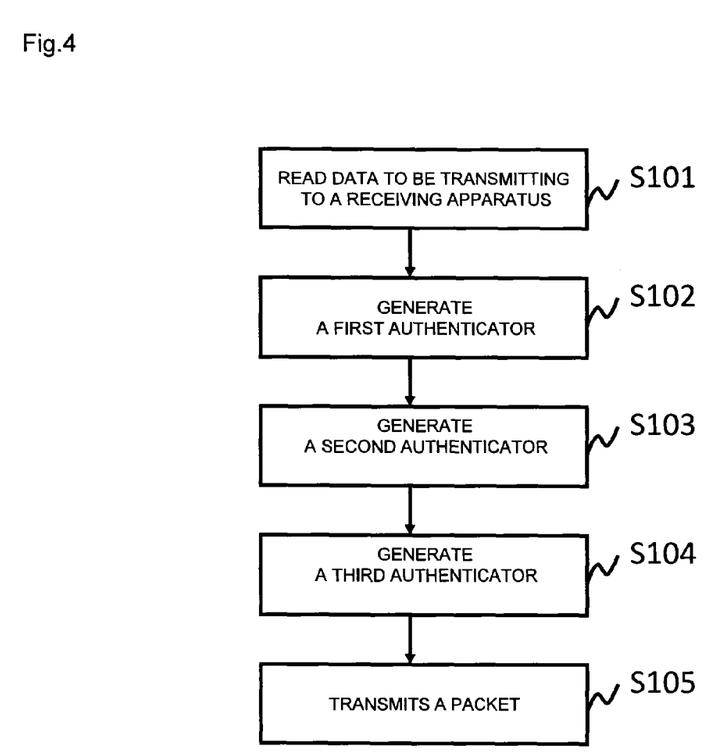
FIG. 4 is a process flow illustrating a transmitting apparatus in a communicating system according to a first embodiment.

FIG. 4 describes a process flow for the transmitting apparatus 11 of this embodiment.

The first authenticator generating unit 1105 reads the data to be transmitting to the receiving apparatus from the data storage 1101. (STEP S101)

The first authenticator generating unit 1105 generates the first authenticator based on the data and the first key stored in the first key storage 1102. (STEP S102)

The second authenticator generating unit 1106 generates the second authenticator based on the second key stored in the second key storage 1103, the additional information generated by the additional information generating unit 1104, by using the first authenticator. (STEP S103)

The third authenticator generating unit 1107 generates the third authenticator based on the first authenticator and the second authenticator. (STEP S104)

The packet transmitting unit 1108 generates a packet including the third authenticator and transmits the packet to the receiving apparatus 12. (STEP S105)

Figure 5:
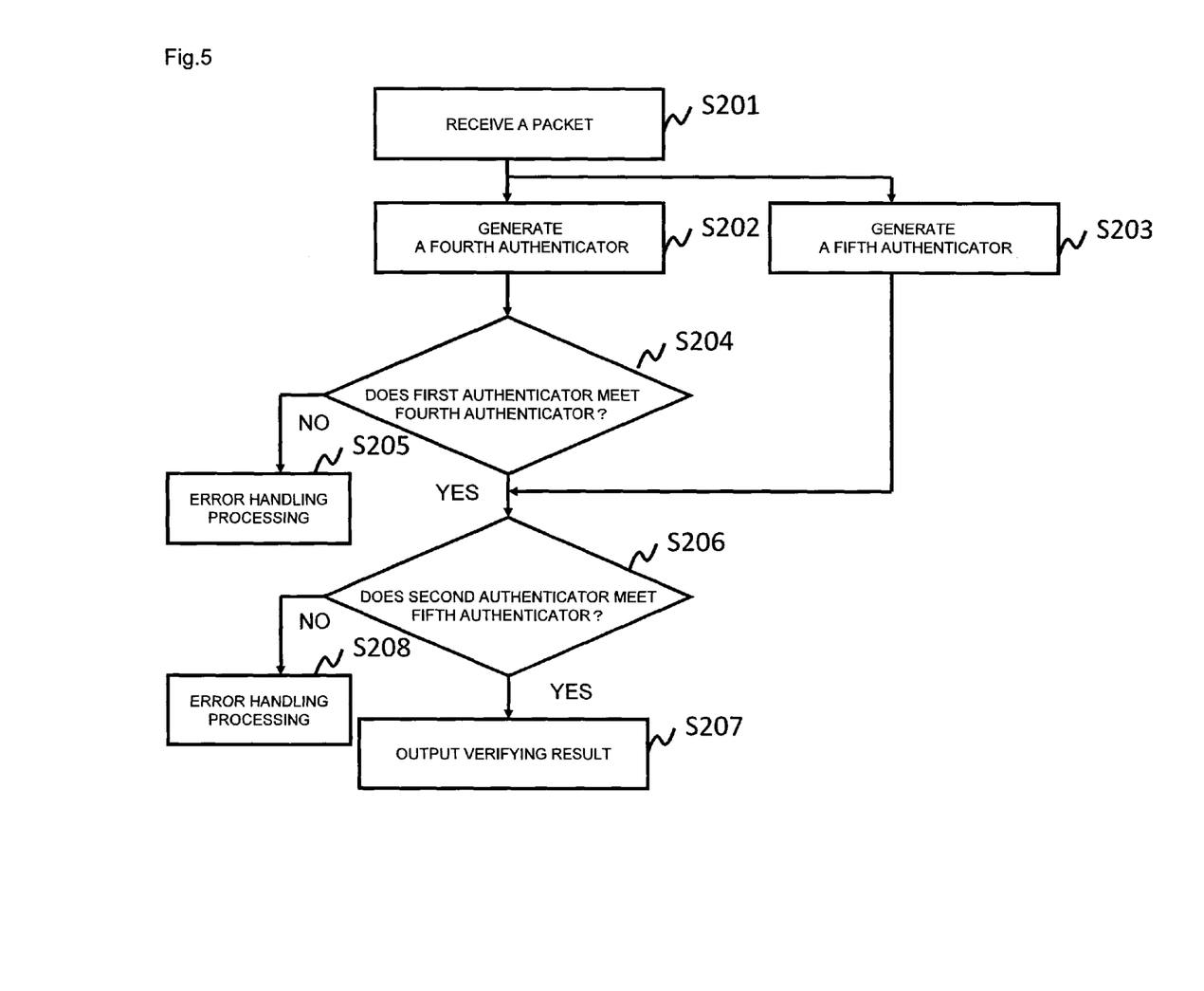
FIG. 5 is a process flow illustrating a receiving apparatus in a communicating system according to the first embodiment.

FIG. 5 describes a process flow for the receiving apparatus 12 in the invention of this embodiment.

The receiving unit in the receiving apparatus 12 receives the packet transmitted by the transmitting apparatus 11. (STEP S201)

The fourth authenticator generating unit 1204 generates the fourth authenticator based on the data included in the received packet and the third key stored in the third key storage 1202. (STEP S202)

The fifth authenticator generating unit 1205 generates the fifth authenticator based on the data included in the received packet and the fourth key stored in the fourth key storage 1203 in parallel with generating the fourth authenticator and additional information generated by additional information generating unit 1210. (STEP S203)

The first verifying unit 1208 verifies whether the fourth authenticator meets a first authenticator extracted by the authenticator extracting unit 1207. (STEP S204)

If the fourth authenticator meets a first authenticator extracted by the authenticator extracting unit 1207 (STEP S204:YES), the first verifying unit 1208 outputs a verification result, which indicates that the fourth authenticator meets a first authenticator extracted by the authenticator extracting unit 1207, to a second verifying unit 1209.

If the fourth authenticator don't meet a first authenticator extracted by the authenticator extracting unit 1207 (STEP S204:NO), the first verifying unit 1208 executes an error handling process. (STEP S205)

The second verifying unit 1209 verifies whether the fifth authenticator meets a second authenticator extracted by the authenticator extracting unit 1207. (STEP S206)

If the fifth authenticator meets a second authenticator extracted by the authenticator extracting unit 1207 (STEP S206:YES), the second verifying unit 1209 outputs a verification result, which indicates that the fifth authenticator meets a second authenticator extracted by the authenticator extracting unit 1207. (STEP S207)

If the fifth authenticator don't meet a second authenticator extracted by the authenticator extracting unit 1207 (STEP S206:NO), the second verifying unit 1209 executes an error handling process. (STEP S208)

A process STEP S205 may or may not meet a process STEP S208.

Given below is the detailed explanation of the second authenticator generating unit 1106 in this embodiment with reference to FIG. 6.

Figure 6:
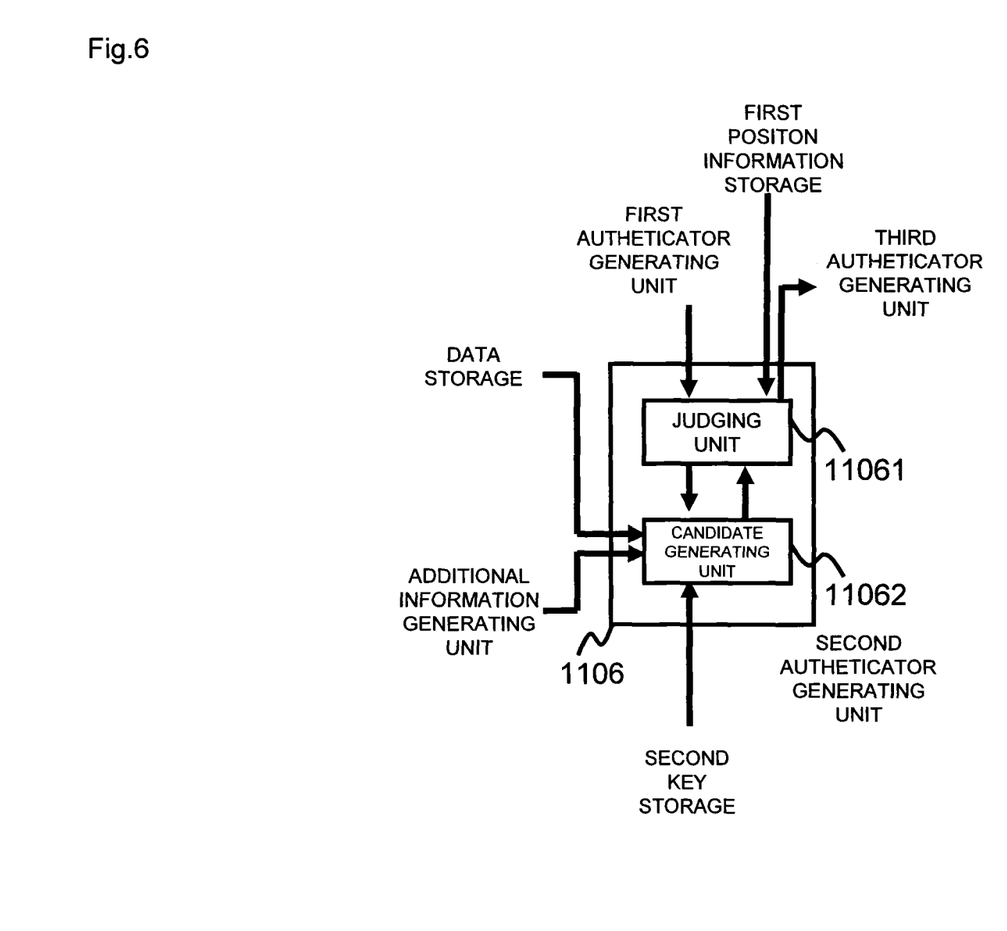
FIG. 6 is a block diagram illustrating a second authenticator generating unit in the communicating system according to the first embodiment.

FIG. 6 is a diagram illustrating the second authenticator generating unit 1106 for this embodiment.

The second authenticator generating unit 1106 includes a judging unit 11061 and a candidate generation unit 11062.

The judging unit 11061 receives the first authenticator from the first authenticator generating unit 1105 and an instruction for generating the second authenticator.

The judging unit 11061 transmits an instruction for generating the candidate to the candidate generating unit 11062.

The judging unit 11061 receives a candidate from the candidate generating unit 11062.

The judging unit 11061 judges the candidate is admitted as the second authenticator when the candidate contains the common part of the first authenticator.

As below, a detail of judging is described.

The judging unit 11061 reads the first position information from the first position information storage 1109.

The judging unit 11061 judges whether a part of the second authenticator indicated by the second field meets a part of the first authenticator indicated by the first field.

The judging unit 11061 transmits a received candidate to the third authenticator generating unit 1107 as the second authenticator, under the candidate contains the common part of the first authenticator.

In other words, the candidate becomes the second authenticator; the candidate contains the common part of the first authenticator.

The judging unit 11061 transmits an instruction to generate a candidate to the candidate generating unit 11062, if the candidate contains no common part of the first authenticator.

The candidate generating unit 11062 receives the instruction for generating the candidate.

The additional information generating unit 1104 generates additional information (first additional information).

The candidate generating unit 11062 receives the additional information (first additional information) from the additional information generating unit 1104.

The candidate generating unit 11062 reads the data to be transmitting to the receiving apparatus from the data storage 1101.

The candidate generating unit 11062 generates the candidate based on the read data and the first additional information.

The candidate generating unit 11062 transmits the candidate to the judging unit 11061.

The candidate generating unit 11062 receives the instruction to generate a candidate.

The additional information generating unit 1104 generates additional information (second additional information).

The candidate generating unit 11062 generates the candidate (second candidate) based on second additional information and the second key and the data.

The second additional information is different from the first additional information.

The additional information is information for generating the candidate.

The additional information may vary when created in each time.

For example, the additional information may be random number or the time-of-day (TOD) clock value, but the examples are by no means limited thereto.

For example, the candidate generating unit 11062 may generate the candidate based on the second key and the data and the additional information by using a one-way function, but the examples are by no means limited thereto. An example of the one-way function is a hash function, but the examples are by no means limited thereto.

Figure 7:
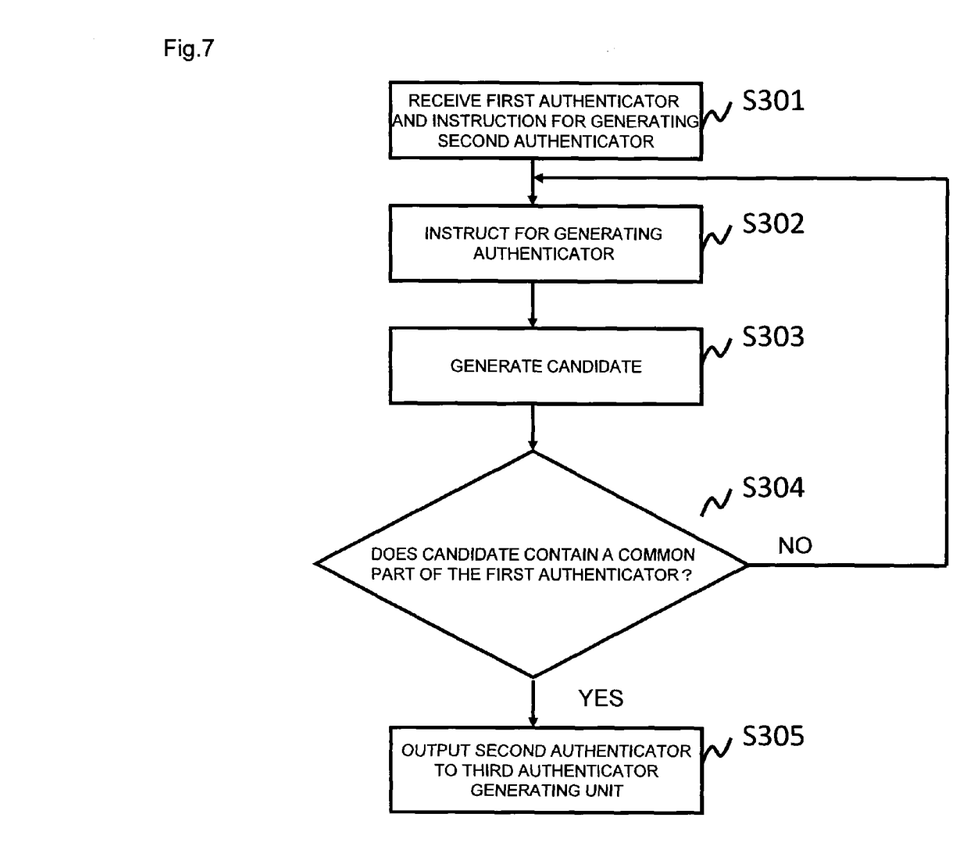
FIG. 7 is a process flow illustrating a second authenticator generating unit in the communicating system according to the first embodiment.

FIG. 7 describes a process flow for the second authenticator generating unit 1106.

The judging unit 11061 receives the first authenticator from the first authenticator generating unit 1105 and the instruction for generating the second authenticator. (STEP S301)

The judging unit 11061 transmits a instruction for generating a candidate. (STEP S302)

The candidate generating unit 11062 receives the instruction for generating a candidate and the additional information (first additional information).

The candidate generating unit 11062 reads the data to be transmitted to the receiving apparatus 12 from the data storage 1101 and the second key from the second key storage 1103.

The candidate generating unit 11062 generates the candidate based on the read data, the first additional information and the second key. (STEP S303)

The judging unit 11061 judges the candidate is admitted as the second authenticator when the candidate contains the common part of the first authenticator. (STEP S304)

The judging unit 11061 transmits a received candidate to the third authenticator generating unit 1107, when the candidate contains the common part of the first authenticator (STEP S304:YES)

The judging unit 11061 transmits a instruction to generate candidate to the authenticator generating unit, if the candidate contains no common part of the first authenticator. (STEP S304:NO)

The invention of this embodiment generates the candidate transmits the candidate to the third authenticator unit when the candidate contains the common part of the first authenticator.

Therefore, the invention of this embodiment can be performed to processing authentication fast and improve security.

The invention of this embodiment protects a computer from DDoS attack as a result because if transmitting unit transmits the third authenticator, the transmitting unit needs to generate both the second authenticator by trial and error and the first authenticator.

It takes a good amount of time that attackers attempt to attack to a server generate the second authenticator correctly, in case that security of the first authenticator is doubted.

Therefore, the server becomes more robust because it is difficult to disable authentication mechanism of the server.

Second Embodiment

Given below is the explanation of a third embodiment with reference to FIG. 8.

Figure 8:
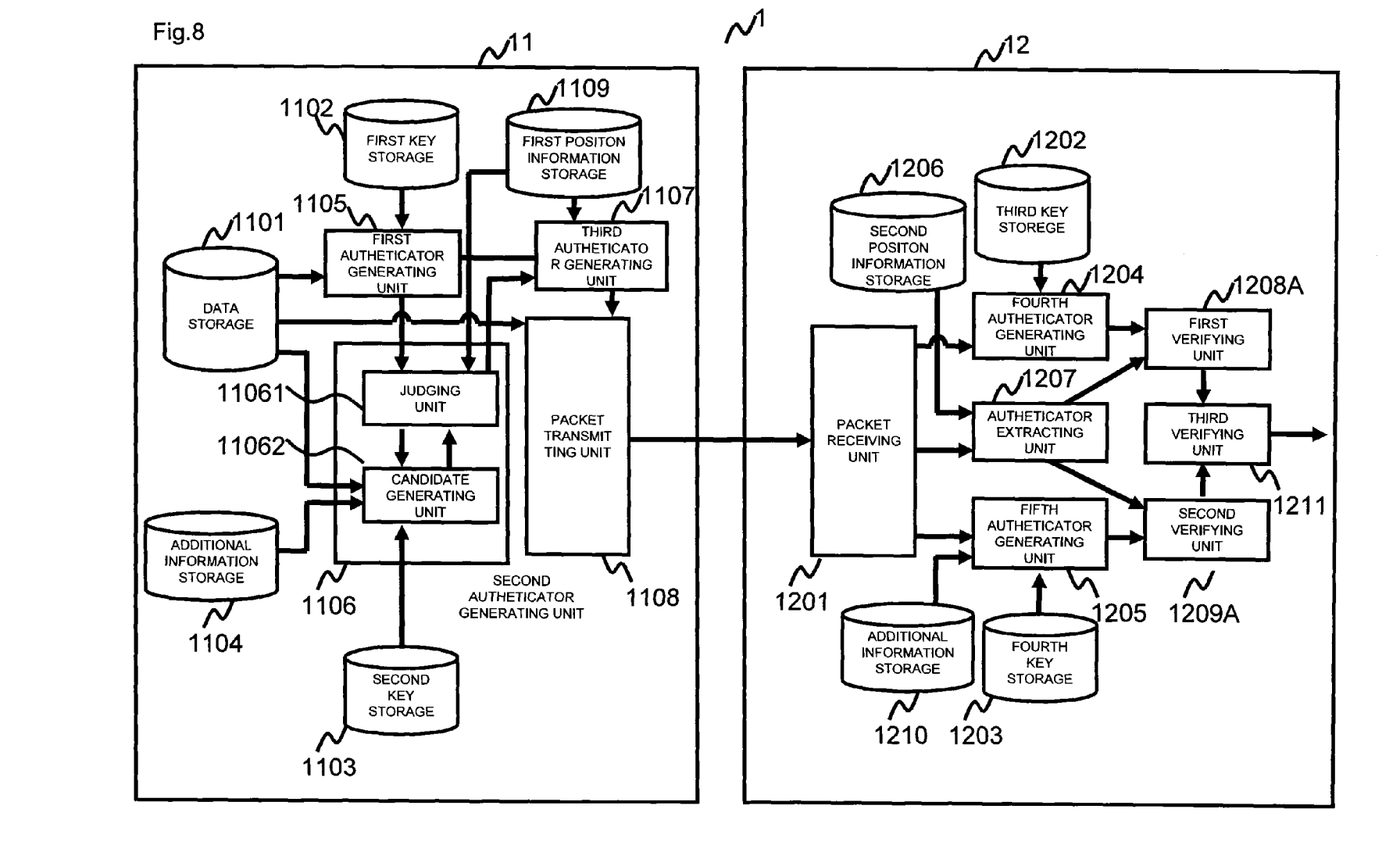
FIG. 8 is a block diagram illustrating a communicating system according to a second embodiment.

FIG. 8 indicates a data communication system 1 for this embodiment.

A first verifying unit 1208A and a second verifying unit 1209A of this embodiment are different from that of the first embodiment.

The data communication system for this embodiment further comprises a third verifying unit 1211 compared to that of the first embodiment.

The first verifying unit 1208A of this embodiment verifies whether the fourth authenticator meets a first authenticator extracted by the authenticator extracting unit 1207.

If the fourth authenticator meets a first authenticator extracted by the authenticator extracting unit 1207, the first verifying unit 1208A transmits a first verification result, that indicates the fourth authenticator meets a first authenticator extracted by the authenticator extracting unit 1207, to a third verifying unit.

The second verifying unit 1209A of this embodiment verifies whether the fifth authenticator meets a second authenticator extracted by the authenticator extracting unit 1207.

If the fifth authenticator meets a second authenticator extracted by the authenticator extracting unit 1207, the second verifying unit 1209A transmits a second verification result, that indicates the fifth authenticator meets a second authenticator extracted by the authenticator extracting unit 1207, to the third verifying unit 1211.

The third verifying unit 1211 verifies whether the third verifying unit 1211 receives the first verification result and the second verification result.

The third verifying unit 1211 outputs verification, if the third verifying unit 1211 receives the first verification result and the second verification result.

The third verifying unit 1211 executes error handling process, if the third verifying unit 1211 receives only the first authenticator, or the third verifying unit 1211 receives only the second authenticator, or the third authenticator unit doesn't receive the first verification result or the second verification result.

Figure 9:
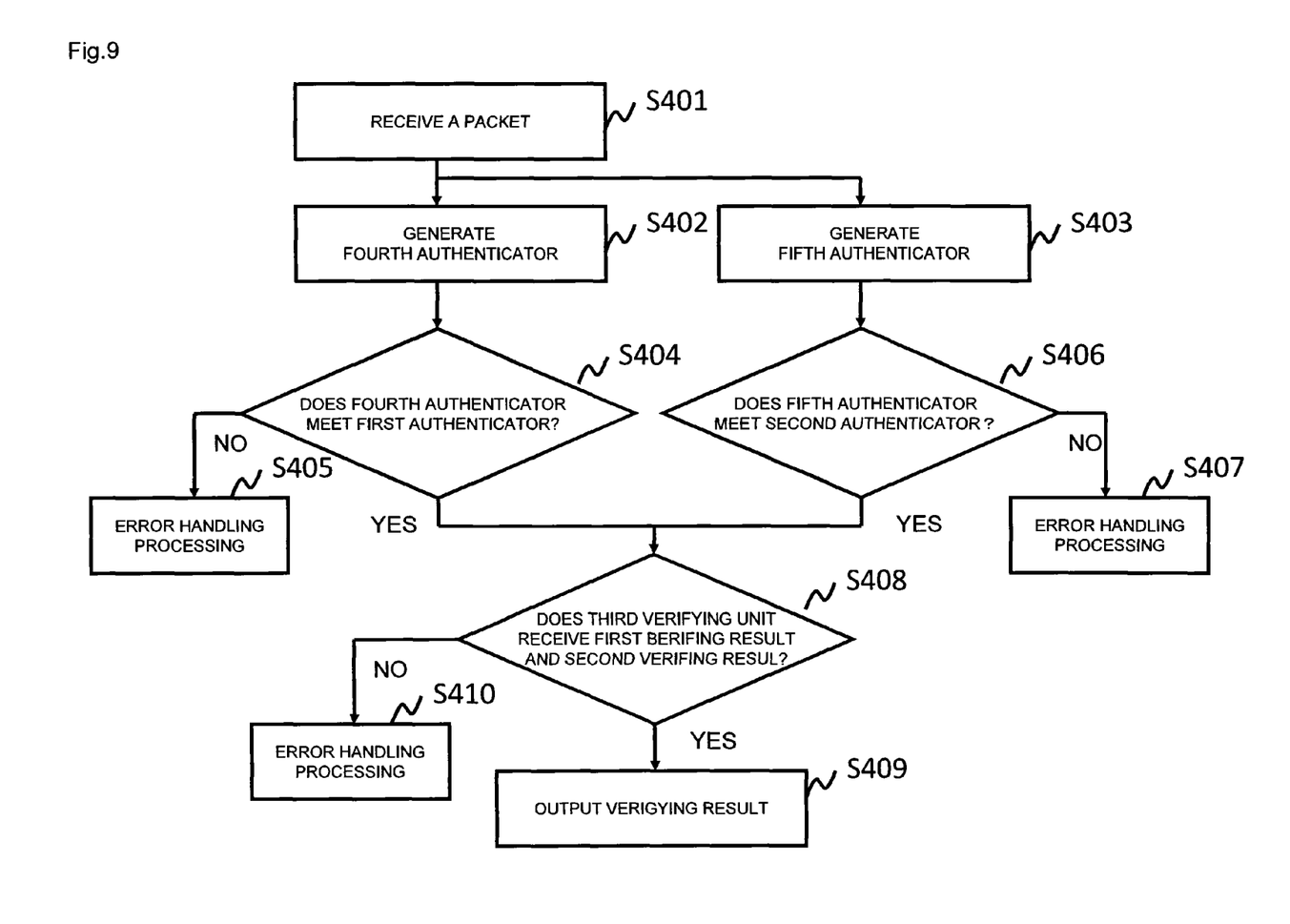
FIG. 9 is a process flow illustrating a receiving apparatus in a communicating system according to the second embodiment.

FIG. 9 describes a process flow for the invention of this embodiment.

The receiving unit in the receiving apparatus 12 receives the packet transmitted by the transmitting apparatus 11. (STEP S401)

The fourth authenticator generating unit 1204 generates the fourth authenticator based on the data included in the received packet and the third key stored in the third key storage 1202. (STEP S402)

The fifth authenticator generating unit 1205 generates the fifth authenticator based on the data included in the received packet and the fourth key stored in the fourth key storage 1203 in parallel with generating the fourth authenticator. (STEP S403)

The first verifying unit 1208A verifies whether the fourth authenticator meets a first authenticator extracted by the authenticator extracting unit 1207. (STEP S404)

If the fourth authenticator meets a first authenticator extracted by the authenticator extracting unit 1207 (STEP S404:YES), the first verifying unit 1208A outputs a first verification result, which indicates that the fourth authenticator meets a first authenticator extracted by the authenticator extracting unit 1207, to a second verifying unit 1209A.

If the fourth authenticator doesn't meet a first authenticator extracted by the authenticator extracting unit 1207 (STEP S404:NO), the first verifying unit 1208A executes an error handling process. (STEP S405)

The second verifying unit 1209A verifies whether the fifth authenticator meets a second authenticator extracted by the authenticator extracting unit 1207. (STEP S406)

If the fifth authenticator meets a second authenticator extracted by the authenticator extracting unit 1207 (STEP S406:YES), the second verifying unit 1209A outputs a verification result, which indicates that the fifth authenticator meets a second authenticator extracted by the authenticator extracting unit 1207, to a third verifying unit 1211.

If the fifth authenticator doesn't meet a second authenticator extracted by the authenticator extracting unit 1207 (STEP S406:NO), the second verifying unit 1209A executes an error handling process. (STEP S407)

The third verifying unit verifies whether the third verifying unit receives a first verification result and a second verification result. (STEP S408)

If the third verifying unit 1211 receives the first verification result and the second verification result (STEP S408:YES), the third verifying unit output a third verification result indicating that the first authenticator is valid and the second authenticator is valid. (STEP S409)

In other words, third verifying unit 1211 verifies whether the fourth authenticator meets a first authenticator extracted by the authenticator extracting unit 1207 and whether the fifth authenticator meets a second authenticator extracted by the authenticator extracting unit 1207.

If the third verifying unit receives only the first verification or only the second verification (STEP 5408: NO), the third verifying unit executes an error handling process. (STEP 5410)

Third Embodiment

Given below is the explanation of a third embodiment with reference to FIG. 10.

Figure 10:
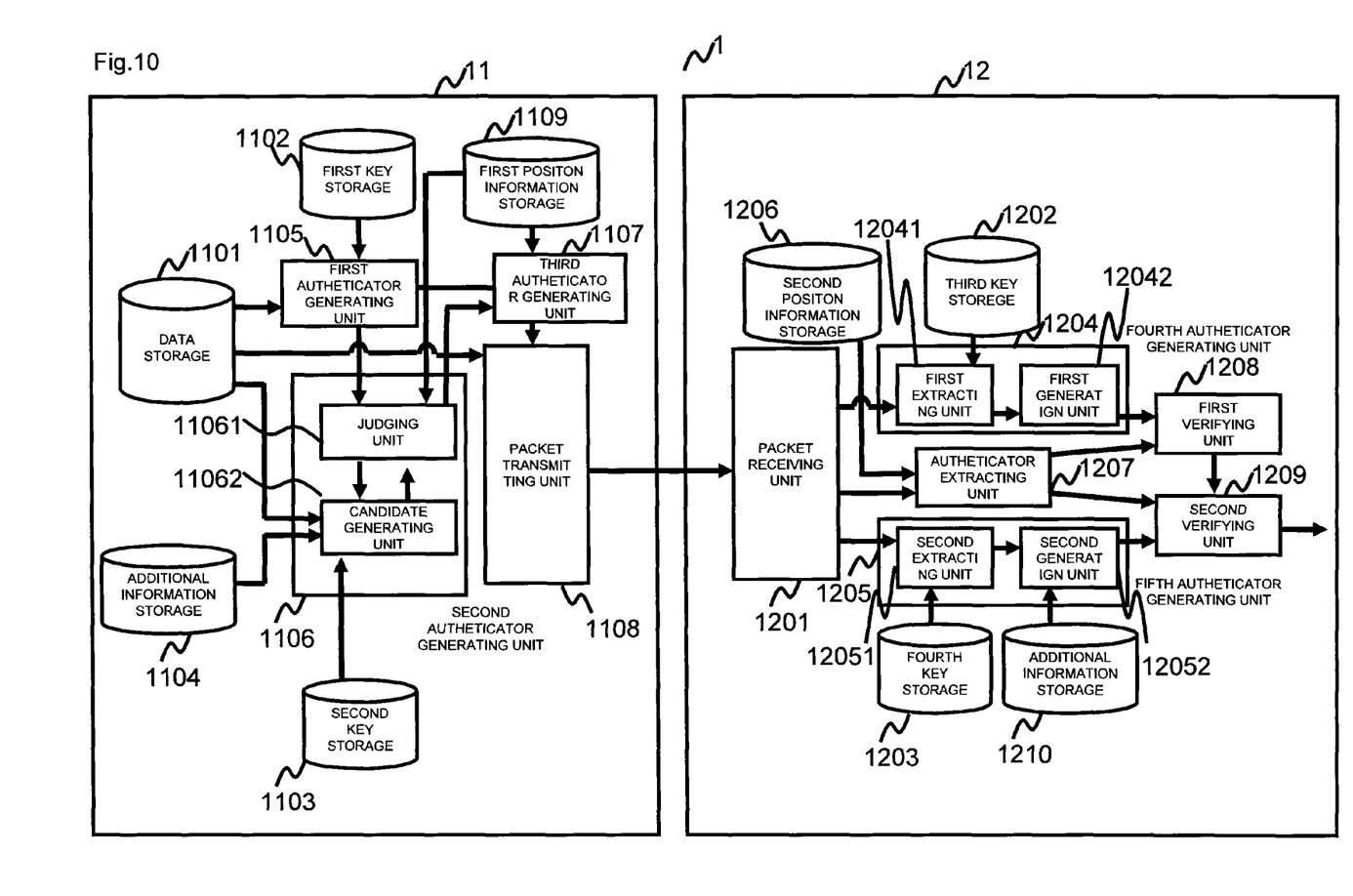
FIG. 10 is a block diagram illustrating a communicating system according to a third embodiment.

FIG. 10 indicates a data communication system for this embodiment. This embodiment details the fourth authenticator generating unit 1204 for the first embodiment and the fifth authenticator generating unit 1205 for the first embodiment.

The fourth authenticator generating unit 1204 includes a first authenticator extracting unit 12041 and a first generating unit 12042.

The third key storage 1202 stores the third keys, corresponding to the identification information for the individual transmitting apparatus.

The first authenticator extracting unit 12041 receives the packet.

The first authenticator extracting unit 12041 extract a third key from the third key storage 1202. The third key corresponds to the identification information for the transmitting apparatus which is included in the packet.

The first authenticator extracting unit 12041 transmits a third key extracted and the data included in the packet to the first generating unit 12042.

The first generating unit 12042 receives the third key extracted and the data included in the packet.

The first generating unit 12042 generates the fourth authenticator based on the third key extracted and the data included in the packet.

The first generating unit 12042 transmits the fourth authenticator to the first verifying unit 1208.

The fifth authenticator generating unit 1205 includes a second authenticator extracting unit 12051 and a second generating unit 12052.

The fourth key storage 1203 stores the fourth keys, corresponding to the identification information for the individual transmitting apparatus.

The second authenticator extracting unit 12051 receives the packet.

The second authenticator extracting unit 12051 extract a fourth key according to identification information for the transmitting apparatus which is included in the packet.

The second authenticator extracting unit 12051 transmits a fourth key extracted and the data included the packet to the second generating unit 12052.

The second generating unit 12052 receives the fourth key extracted and the data included in the packet.

The second generating unit 12052 generates the fifth authenticator based on the fourth key extracted and the data included in the packet and the additional information generated by the additional information generating unit 1210.

The second generating unit 12052 transmits the fifth authenticator to the second verifying unit 1209.

Figure 11:
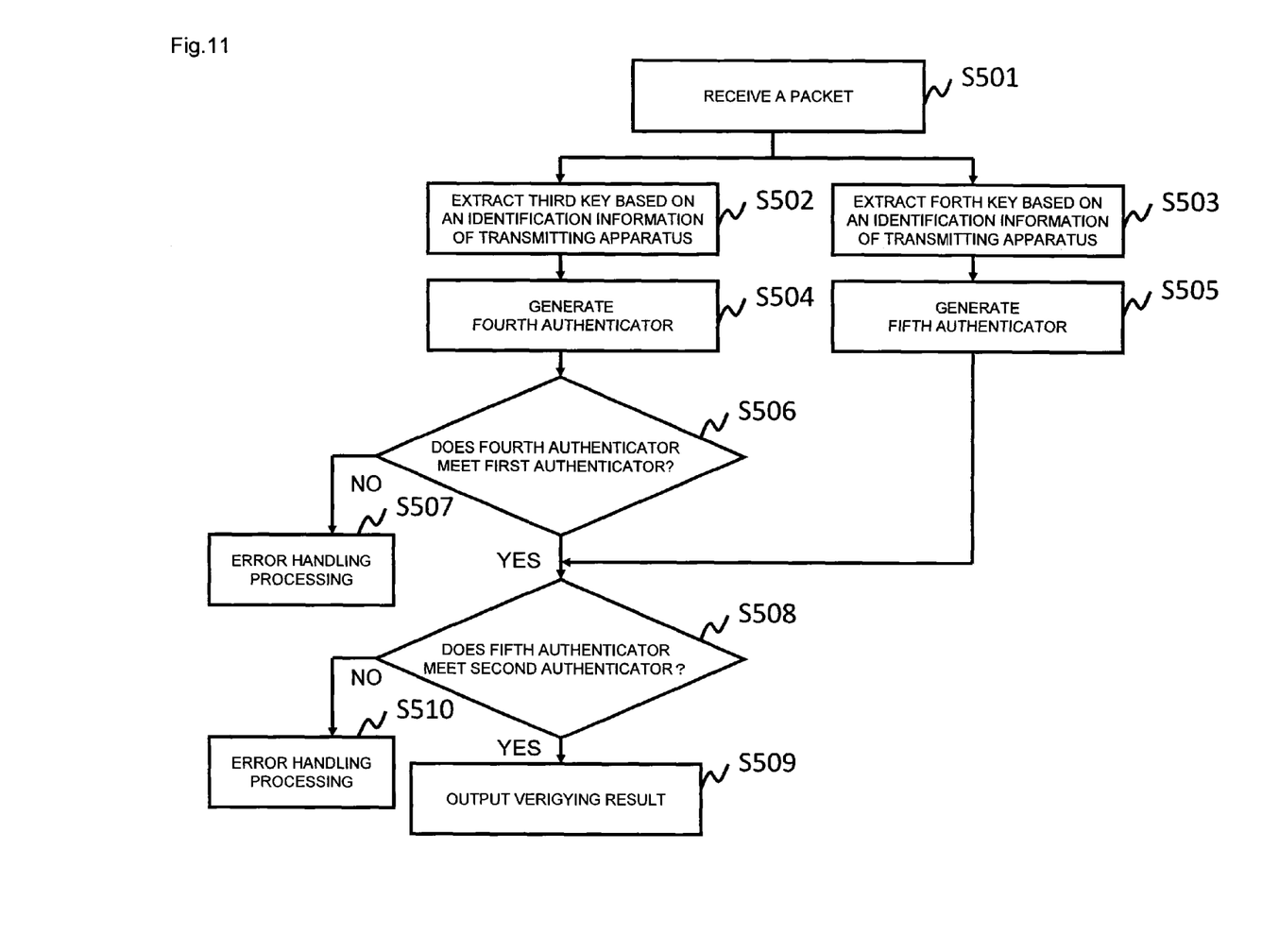
FIG. 11 is a process flow illustrating a receiving apparatus in a communicating system according to the third embodiment.

FIG. 11 describes a process flow for the receiving unit in the invention of this embodiment.

The packet receiving unit 1201 in the receiving apparatus 12 receives the packet transmitted by the transmitting apparatus 11. (STEP S501)

The first authenticator extracting unit 12041 extracts a third key corresponding to the identification information for the individual transmitting apparatus which is included in the packet from the third key storage. (STEP S502)

The second authenticator extracting unit 12051 extracts a fourth key corresponding to the identification information for the transmitting apparatus which is included in the packet from fourth key storage 1203. (STEP S503)

The first generating unit 12042 generates the fourth authenticator based on the third key extracted and the data included the packet. (STEP S504)

The second generating unit 12052 generates the fifth authenticator based on the fourth key extracted and the data included in the packet. (STEP S505)

The first verifying unit 1208 verifies whether the fourth authenticator meets a first authenticator extracted by the authenticator extracting unit 1207. (STEP S506)

If the fourth authenticator meets a first authenticator extracted by the authenticator extracting unit 1207 (STEP S506:YES), the first verifying unit 1208 outputs a verification result, which indicate that the fourth authenticator meets a first authenticator extracted by the authenticator extracting unit 1207, to a second verifying unit 1209.

If the fourth authenticator doesn't meet a first authenticator extracted by the authenticator extracting unit 1207 (STEP S506:NO), the first verifying unit 1208 executes an error handling process. (STEP S507)

The second verifying unit 1209 verifies whether the fifth authenticator meets a second authenticator extracted by the authenticator extracting unit 1207. (STEP S508)

If the fifth authenticator meets a second authenticator extracted by the authenticator extracting unit 1207 (STEP S508:YES), the second verifying unit 1209 outputs a second verification result, which indicates that the fifth authenticator meets a second authenticator extracted by the authenticator extracting unit 1207. (STEP S509)

If the fifth authenticator doesn't meet a second authenticator extracted by the authenticator extracting unit 1207 (STEP S508:NO), the second verifying unit 1209 executes an error handling process. (STEP S510)

Incidentally, the method described in each of the embodiments may be stored and distributed, as a program which can make a computer execute the method, in a storage medium such as a magnetic disk (a floppy (registered trademark) disk, a hard disk etc.), an optical disk (CD-ROM, DVD, etc.), a magneto-optical disk (MO) or a semiconductor memory.

In addition, the storage medium may take any storage format as long as the storage medium can store a program and the program can be read from the storage medium by the computer.

An OS (Operating System), MW (Middleware) such as database management software and network software, etc. operating on the computer may execute part of each process for achieving each of the embodiments, based on an instruction given from the program installed in the computer through the storage medium.

In the embodiment, the storage medium is not limited to a medium independent of a computer, but may include a storage medium in which a program transmitted through an LAN, the Internet, etc. is downloaded and stored or temporarily stored.

In addition, the number of storage media is not limited to one. When processing in each of the embodiments is executed through plural media, these media are also included in the storage medium in the embodiment and any configuration may be used as the medium configuration.

In the embodiment, the computer is a device which executes each process in each of the embodiments based on a program stored in the storage medium. The computer in the embodiment may have any configuration. For example, the computer in the embodiment may be a single device such as a computer or may be a system or the like composed of plural devices connected on a network.

In the embodiment, the computer is not limited to a personal computer but may include a processor or a microcomputer included in an information processing apparatus. The computer in the embodiment is simply a generic term for an apparatus or device in which the function of the embodiment can be implemented by a program.

Although some embodiments have been described, these embodiments are presented by way of example but have no intention of limiting the scope of the invention. These new embodiments may be carried out in other various modes and can be omitted, replaced or changed variously without departing from the scope of the invention. Not only the embodiments and their modifications but also their equivalents fall within the scope of Claims.

What is claimed is:

1. A transmitting apparatus comprising:
   a first authenticator generating unit that generates a first authenticator based on data to be transmitting to a receiver and a first key, the first key authenticator having a common part;
   an additional information generating unit that generates first additional information;
   a candidate generating unit that generates a first candidate for a second authenticator, based on the data, a second key and the first additional information;
   a judging unit that judges the first candidate is admitted as the second authenticator, when the first candidate contains the common part of the first authenticator and;
   a third authenticator generating unit that generates a third authenticator, the third authenticator being generated using the second authenticator and a first part that is derived by removing the common part from the first authenticator;
   a transmitting unit that transmits the data and the third authenticator, wherein the additional information generating unit that generates second additional information when the first candidate contains no common part, and
   the candidate generating unit generates a second candidate for a second authenticator based on the data, the second key and the second additional information.

2. A communication system comprising:
   a transmitting apparatus;
   a receiving apparatus,
   wherein the transmitting apparatus comprising:
   a first authenticator generating unit that generates a first authenticator based on data to be transmitting to the receiving apparatus and a first key, the first key authenticator having a common part;
   an additional information generating unit to generate first additional information;
   a candidate generating unit that generates a first candidate for a second authenticator based on the data, a second key and first additional information;
   a judging unit that judges whether the first candidate is admitted as the second authenticator, when the first candidate contains the common part of the first authenticator;
   a third authenticator generating unit that generates a third authenticator, the third authenticator being generated using the second authenticator and a first part that is derived by removing the common part from the first authenticator;
   a transmitting unit that transmits the data and the third authenticator, wherein the additional information generating unit that generates a second additional information when the first candidate contains no common part,
   the candidate generating unit that generates second candidate for a second authenticator based on the data, the second key and second additional information,
   wherein the receiving apparatus comprising:
   a receiving unit receives the data with the third authenticator;
   a extracting unit extracts the first authenticator and the second authenticator from the third authenticator;
   a fourth authenticator generating unit that generates a fourth authenticator based on a received data and a third key;
   a fifth authenticator generating unit that generates a fifth authenticator based on the received data and a fourth key;
   a first verifying unit that verifies whether the first authenticator meets the fourth authenticator;
   a second verifying unit that verifies whether the second authenticator meets the fifth authenticator when the first authenticator meets the fourth authenticator.

3. A communication system comprising:
   a transmitting apparatus;
   a receiving apparatus;
   wherein the transmitting apparatus comprising:
   a first authenticator generating unit that generates a first authenticator based on data to be transmitting to the receiving apparatus and a first key, the first key authenticator having a common part;
   an additional information generating unit that generates first additional information;
   a candidate generating unit that generates a first candidate for a second authenticator based on the data, a second key and first additional information;
   a judging unit that judges the first candidate is admitted as the second authenticator, when the candidate contains the common part of the first authenticator and;
   a third authenticator generating unit that generates a third authenticator, the third authenticator being generated using the second authenticator and a first part that is derived by removing the common part from the first authenticator;
   a transmitting unit that transmits the data and the third authenticator, wherein the additional information generating unit that generates a second additional information when the candidate contains no common part,
   wherein the candidate generating unit that generates a second candidate based on the data, the second key and the second additional information,
   wherein the receiving apparatus comprising:
   a receiving unit that receives the data with the third authenticator;
   a extracting unit that extracts the first authenticator and the second authenticator from the third authenticator;
   a fourth authenticator generating unit that generates a fourth authenticator based on a received data and a third key;
   a fifth authenticator generating unit that generates a fifth authenticator based on a received data and a fourth key;
   a first verifying unit that verifies whether the first authenticator meets the fourth authenticator;
   a second verifying unit that verifies whether the second authenticator meets the fifth authenticator;

a third verifying unit that verifies whether the first authenticator receives a first authentication result and a second verification result.

* * * * *